T. H. MARTEN.
CRANE.
APPLICATION FILED APR. 23, 1914.

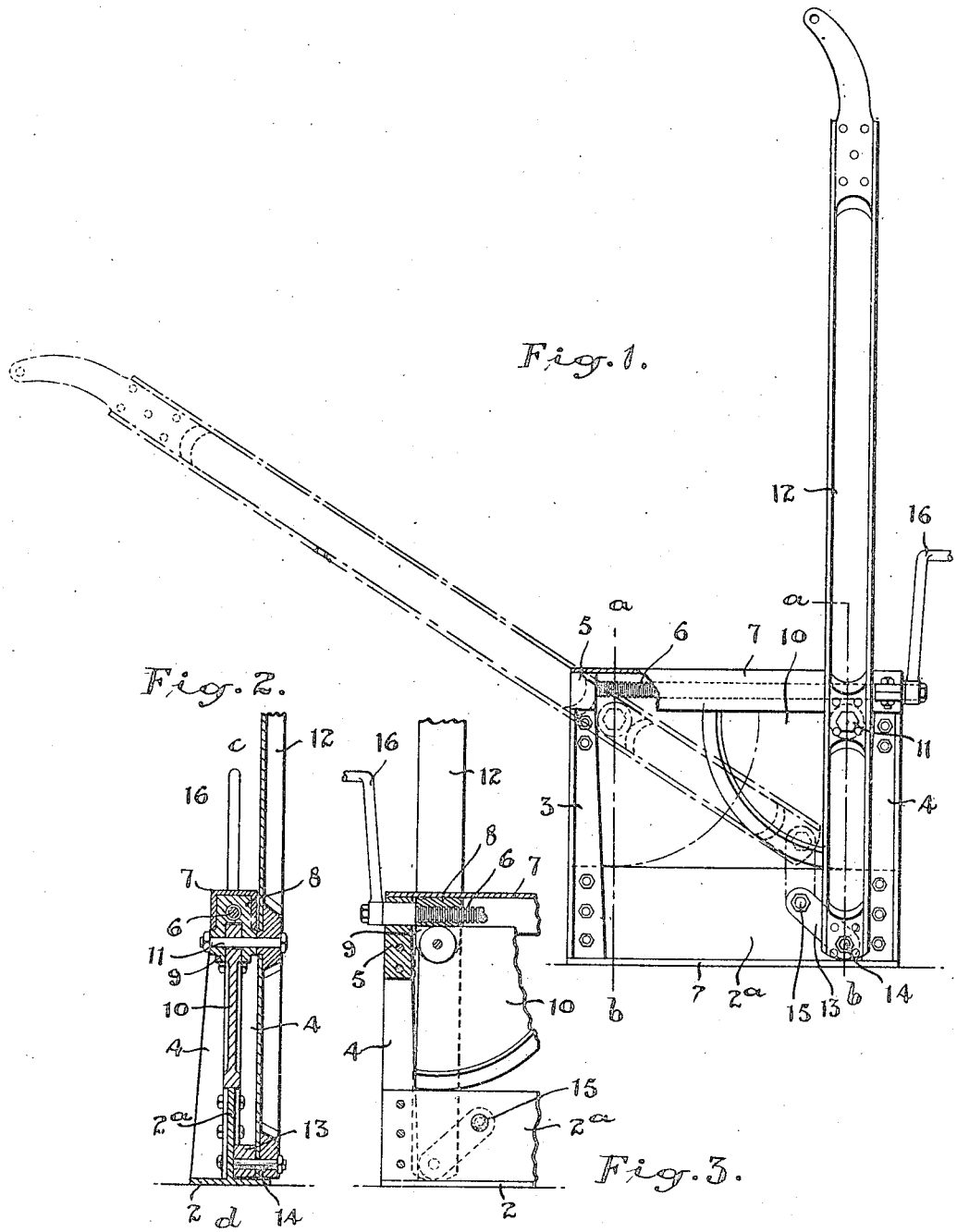

1,123,132.

Patented Dec. 29, 1914.
3 SHEETS—SHEET 2.

Witnesses.

Inventor.
Thomas Henry Marten.

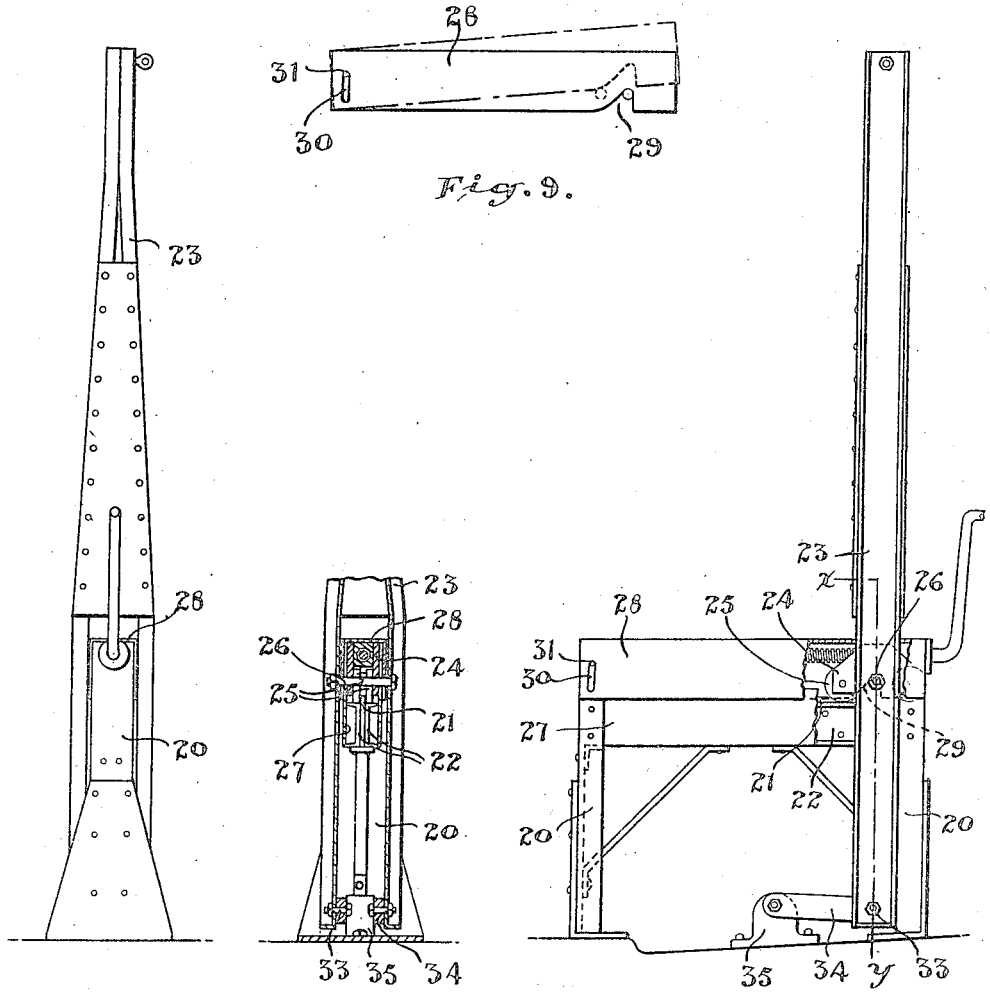

UNITED STATES PATENT OFFICE.

THOMAS HENRY MARTEN, OF TORONTO, ONTARIO, CANADA, ASSIGNOR, BY DIRECT AND MESNE ASSIGNMENTS, TO THE MARTEN FREEMAN COMPANY, LIMITED, OF TORONTO, CANADA.

CRANE.

1,123,132. Specification of Letters Patent. Patented Dec. 29, 1914.

Application filed April 23, 1914. Serial No. 833,893.

*To all whom it may concern:*

Be it known that I, THOMAS HENRY MARTEN, a subject of the King of Great Britain, and resident of the city of Toronto, county of York, Province of Ontario, in the Dominion of Canada, have invented certain new and useful Improvements in Cranes, as described in the following specification and illustrated in the accompanying drawings, that form part of the same.

The principal objects of the present invention are, to provide a form of crane particularly adaptable for use as a ship's davit, which may be operated with greater ease and speed to facilitate the rapid launching of the boats.

A further object is to devise a mechanism in which the stress of the load is so distributed as to minimize the strain upon the various parts, thereby increasing the factor of safety and minimizing the power required to operate same.

The principal feature of the invention consists in the novel construction and arrangement of parts, whereby a compensating equalizing of the stress of the load carried by a boom supported upon a moving fulcrum is effected to relieve the strain upon the operating mechanism.

Figure 4:
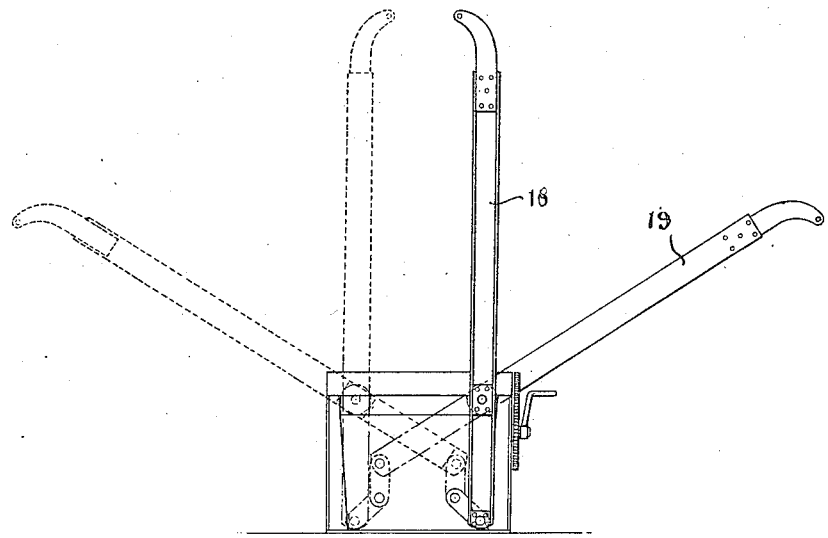
Figure 5:
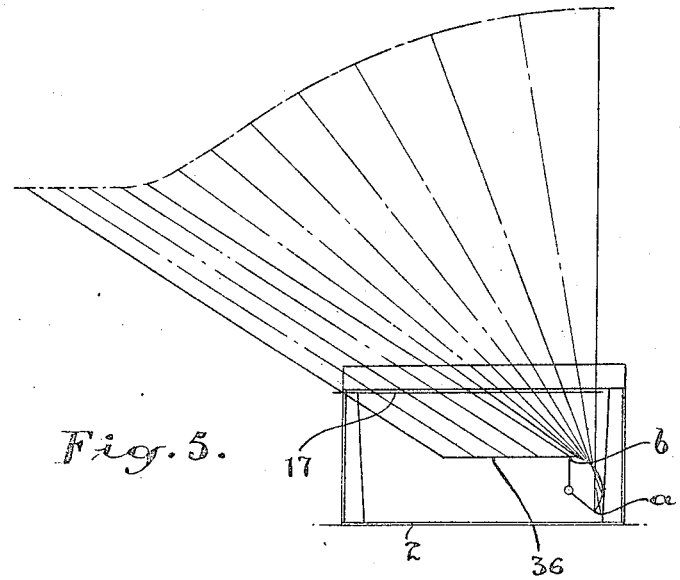

In the drawings, Figure 1 is an elevational view of a device constructed in accordance with this invention showing the boom in its upright position in full lines and in its full extended position in dotted lines, part of the frame structure being broken away to disclose the fulcrum shifting screw. Fig. 2 is a vertical cross sectional view through the line *a—b* of Fig. 1. Fig. 3 is a vertical longitudinal sectional view through the line *c—d* of Fig. 2. Fig. 4 is a diagrammatic elevational view of a modified application of the invention with a pair of arms operating in unison, one being in its neutral or upright position and the other extended. Fig. 5 is a diagram illustrating the course of travel of the boom and showing the manner in which the boom support may be extended in a horizontal direction after the boom has reached the limit of its pivotal throw. Fig. 6 is a side elevational view illustrating a modified form of the present invention. Fig. 7 is an end elevational view of the device shown in Fig. 6. Fig. 8 is a cross sectional view through the line *x—y* of Fig. 6.

Fig. 9 is a side elevational view of the cap for inclosing the boom operating mechanism, shown in the raised position in dotted lines.

Like numerals of reference indicate corresponding parts in each figure.

Referring to the drawings, 1 is the supporting frame here shown formed of a base member 2 preferably of a T section the web 2ª of which forms a horizontal trackway.

3 and 4 are uprights arranged in pairs at each end of the base 2.

5 are blocks secured to the upper ends of the uprights 3 and 4 and having horizontal journal bearings therein in which the screw spindle 6 is journaled.

7 is a cap piece of an inverted U section extending over the spindle 6 and secured at the ends of the blocks 5.

8 is a block threaded on the spindle 6 and slidably arranged within the cap 7, said block having a downwardly extending jaw member 9 in which is secured the rolling support 10, which support is shown in Figs. 1, 2 and 3 as a quadrant segment of a large roller, the periphery of which rests in rolling contact on the horizontal web of the base 2.

11 is a spindle extending through the jaw 9 and forming the axle of the roller 10 and extending outwardly therebeyond.

12 is the boom pivoted upon the extending end of the spindle 11, being thus carried by the block 8 and roller 10 the weight thereof being carried upon said roller and the base.

13 is a link pivotally secured at one end to a bolt 14 secured in the lower extremity of the boom 12. The opposite end of the link 13 is pivotally secured to the web of the base 2 by a bolt 15 preferably at a point above and at one side of the swivel connection to the boom, the link being preferably arranged extending upwardly and forwardly from the boom at about an angle of forty-five degrees when the boom is in the vertical position.

In operating this device the spindle 6 is rotated by a suitable crank 16 secured to one end thereof and as the crank and spindle are rotated, the block 8 threaded thereon is caused to travel longitudinally in the guide way formed by the cap 7. As the block 8 is operated by the spindle it carries with it the fulcrum support of the boom and said fulcrum being supported by the roller 10 moves freely and without undue stress upon the operating screw. The lower end of the boom is limited in its movement by the link 13 and as the fulcrum support of the boom moves outwardly the link swings on its pivot 15, the pivot connection 14 of the link and boom traveling through the arc of a circle whose axis is the bolt 15. A very peculiar and desirable result is obtained by this unique construction. Referring to the diagram in Fig. 5 it will be noted that the upper end of the boom swings forwardly from the vertical position and slightly downward until the pivot connection 14 to the link 13 reaches a horizontal position in relation to the pivot 15. As the block 8 is moved forwardly from this point the link swings upwardly from the horizontal and consequently causes the boom to tilt upon its pivot 11 to a much less extent than it would otherwise do, with the result that there is a less drop to the movement of the outer end of the boom and greater longitudinal travel per ratio movement of the block 8 than during the first part of the movement. It will be noted on reference to the diagram that for the same length of movement of the block 8 indicated on the line 17 the outward travel of the outer end of the boom gradually lessens toward the outward limit of its throw. It will be seen that as the boom swings forward from its upright position, the lower end below the fulcrum swings rearwardly and is restrained in its movement by the link 13 and the stress of the load is distributed upon both sides of the fulcrum. The dead weight of the load is carried by the roller support of the fulcrum and as the said fulcrum moves farther outward the link 13 swings on its pivot to allow the inner end of the boom to swing upward producing a compensating distribution of the load on each side of the fulcrum, thereby minimizing the longitudinal strain upon the operating screw. The effect of this compensating distribution of stresses is to reduce the longitudinal stress upon the operating screw practically to zero when the boom is in its outermost position and as the stress upon such screw when the boom is in the upright position is zero, the maximum longitudinal stress occurs when the boom is in the midway position from which point the stress gradually lessens as the boom extends farther, the load stress being carried by the roller support in a perpendicular direction and directly supported by the base. The advantages gained by such a mechanism will be readily apparent to those having a knowledge of the art, particularly in connection with snips' davits as the greatest strain and consequently most difficult period of operation of the davit mechanism is usually when the arm is fully extended carrying a loaded boat projecting over the ship's side.

This device differs materially from constructions wherein the boom is provided with a quadrant base and upon which the boom rolls, pivoting upon a pivot carried by a traveling block operated by a screw, in that in such constructions there is no equalizing distribution of the stresses, the weight being supported perpendicularly by the quadrant end of the boom from the fulcrum point but the resultant of the two forces, that is, the perpendicular support and the outwardly projecting boom bearing the load, is carried directly by the screw and consequently the farther the boom extends the greater is the stress upon the screw. In the present case the boom is carried by a roller support which is here shown of quadrantal shape but may be any desirable form of a traveler in the form of a single roller or a carriage but which carries the weight of the load placed upon the boom and the lower end of the boom is limited in its operation by a swivel link connection. In the modification of the device shown in Fig. 4 the construction and operation are exactly the same with the exception that a pair of booms are connected to the one operating spindle, one at each side of the base and one having the lower link connection arranged at one end of the base and the other at the other end so that when the boom 18 is in the vertical position the boom 19 will be in an extended position and on the operation of the operating spindle the boom 18 is extended in the opposite direction and the boom 19 brought to the vertical position. This form of structure is particularly adaptable for ships' davits where the boats are stored in a double bank, the boom extending in-board being connected to the inwardly banked boat and the outer one being connected to the outer boat so that when one boat is swung outboard the other boat will be brought into position ready for swinging out on the recovery of the falls.

In the modified form of the device illustrated in Figs. 6, 7 and 8, the construction of the frame is altered from that illustrated in the other figures, a track-way being formed between the uprights 20 by a central vertically arranged plate 21 and channel sections 22 secured to the sides thereof. The fulcrum support for the boom in this form of the device is in the form of a carriage or trolley 24 having the grooved wheels 25 arranged at each end adapted to run on the trackway formed by the plate 21 and channels 22, the plate entering the central grooves and preventing any side lash. The boom supporting fulcrum pin 26 is secured in the trolley 24 mid-way between the wheels 25 and projects outwardly on each side. 27 are plates secured to the uprights 20 and extending longitudinally beside the track-way, the upper edges thereof being arranged to just clear the underside of the fulcrum pin 26. 28 is an inverted U-shaped cover normally resting upon the uprights and having openings 29 in the sides adjacent to the in-board end of the frame through which the projecting ends of the fulcrum 26 extend. The openings are beveled away from the fulcrum pin toward the forward end of the machine so that when the trolley is caused to travel upon the track-way the beveled edges of the cover will ride upon the pin and the cover will lift upwardly allowing the boom to swing forward freely. The forward or out-board end of the cover is provided with a longitudinal slot 30 which may be covered over if desired and into which the rigid pins 31 secured to the upright extend. These pins and slot hold the cover from displacement from off the machine but allow it to lift upwardly as the boom fulcrum travels forward. 23 is the boom, here shown formed of a pair of channel bars pivotally secured intermediate of their length on the longitudinally extending ends of the fulcrum pins 26 and bent inwardly above the top of the frame and rigidly secured together. 33 is a bolt extending between the lower ends of the side members of the boom and 34 is a link pivoted upon the bolt 33 between said side members and extending in an out-board direction from the boom and pivotally connected to a bracket 35 which may or may not be a part of the frame structure but which is rigidly held in place approximately mid-way between the in-board and out-board ends of the frame. The link 34 corresponds with the link 13 but in this form it is shown arranged in a horizontal position when the boom is in the vertical position. This arrangement of the link may be found preferable under some circumstances to effect a more uniform distribution of the load between the in-board and out-board ends of the boom. It will be noted that the upright portion of the mechanism is entirely incased and cannot be affected by any kind of weather conditions so that it cannot be operated and all the working parts are thoroughly protected.

In the diagram shown in Fig. 5, I show the line 36 representing the course of travel of the lower end of the boom, which when connected by the link connection as shown in the form of the device illustrated in Fig. 1, moves from the point $a$ to the point $b$. It may be found desirable in some cases to dispense with the link and the compensating effect is accomplished by extending the pivot pin 14 at the lower end of the boom into a cam slot formed in the base in order to control the movement of the boom and with this form of construction the cam slot could be extended horizontally from the point $b$ in the diagram to any desirable length in order that the boom might be carried out-board in a horizontal direction to effect a greater extension of the arm from the in-board position.

Certain specific applications of the invention are herein shown and described but it must be understood that other modifications of structure may be effected without departing from the principle of effecting a compensating distribution of the stress of the load to each side of the fulcrum.

What I claim as my invention is:—

1. In a crane, a frame, a movable fulcrum supported on said frame, means for moving said fulcrum, a boom pivoted intermediate of its length upon said fulcrum, and means operatively engaging the boom below the fulcrum and retaining the point of operative connection therewith inboard of the fulcrum as the said fulcrum is moved outwardly and effecting a compensating distribution of the stress of the load each side of the fulcrum to relieve the stress upon the fulcrum moving means.

2. In a crane, a frame, a movable fulcrum supported on said frame, means for moving said fulcrum, a boom pivoted intermediate of its length upon said fulcrum, and means pivotally connected to the lower end of said boom and guiding the point of operative connection of the inboard end of the boom in a limited path on the inboard side of the fulcrum as the fulcrum is moved outwardly to effect a compensating distribution of the load each side of the fulcrum.

3. In a crane, a frame having a rigid trackway, a rolling member supported on said trackway, a boom pivotally supported intermediate of its length on said rolling member, means for operating said rolling member on said trackway, and means pivotally connected to the lower end of said boom and guiding the effective point of connection with said means in a limited path on the inboard side of the fulcrum to effect a compensating distribution of the strain of the load each side of the fulcrum.

4. In a crane, a frame having a rigid trackway, a rolling member supported on said trackway, a boom pivotally supported intermediate of its length on said rolling member, means for operating said rolling member on said trackway, and a link having one end thereof pivotally connected to the lower end of the boom and the other end connected to a fixed pivot arranged outboard of the lower end of said boom and guiding the lower end of said boom in a limited path at the inboard side of the fulcrum.

5. In a crane, a frame having a rigid trackway, a rolling member supported on said trackway, a boom pivotally supported intermediate of its length on said rolling member, means for operating said rolling member on said trackway, and a link pivotally connected at one end to the lower end of said boom and extending angularly outward from said boom and pivotally connected at its outer end to a fixed pivot allowing the inner end of the boom to swing in a limited path on the inboard side of the fulcrum.

6. In a crane, a frame having a rigid trackway, a horizontal screw spindle journaled in said frame, a block threaded on said spindle, a carriage operating on said trackway and supporting said block, a boom fulcrumed intermediate of its length on said carriage, and means operatively engaging the lower end of said boom and guiding same in a limited path inboard of the fulcrum to distribute the stress of the load each side of the fulcrum.

7. In a crane, a frame, comprising, a horizontal trackway supported on uprights at the ends, a screw spindle extending between said uprights, a block threaded on said spindle, a rolling support traveling on said trackway and carrying said block, a boom carried by said rolling support and pivoted at its point of support intermediate of its length, means for guiding the lower end of said boom in a limited path, and a movable cover inclosing said fulcrum operating mechanism.

8. In a crane, a frame formed of a pair of uprights and a rigid trackway extending therebetween, a carriage traveling on said trackway, means for operating said carriage, a fulcrum pin extending laterally from said carriage, side plates rigid with said frame extending on each side of said carriage below the fulcrum pin, a cover closing in said carriage and operating means and having side plates overlapping the upper edges of the rigid side plates and having orifices formed with a sloping forward edge through which the fulcrum pins extend, said side plates being adapted to lift upwardly on the movement of the carriage to allow the carriage to travel outwardly, means for limiting the movement of said cover sides, a boom pivoted intermediate of its length on said fulcrum, and means for guiding the lower end of said boom in a limited path and distributing the stress of the load on each side of the fulcrum.

9. In a crane, a frame, a screw spindle horizontally journaled in said frame, a movable fulcrum operated by said spindle, a pair of booms each pivotally connected intermediate of their length to said fulcrum, and pivotal link members secured to the lower ends of said booms and to fixed pivots so arranged as to cause either of said booms to move to a vertical position when the other moves to its extreme extended position.

Signed at the city of Toronto, county of York, Ontario, Canada, this 28th day of March, 1914.

THOMAS HENRY MARTEN.

Witnesses:
  E. HERON,
  D. S. TOVELL.

Copies of this patent may be obtained for five cents each, by addressing the "Commissioner of Patents, Washington, D. C."